(12) United States Patent
Nagamine et al.

(10) Patent No.: US 11,422,537 B2
(45) Date of Patent: Aug. 23, 2022

(54) RECOGNITION DEVICE, SYSTEM AND RECOGNITION METHOD

(71) Applicant: FANUC CORPORATION, Yamanashi (JP)

(72) Inventors: Akihide Nagamine, Yamanashi-ken (JP); Hideki Otsuki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 55 days.

(21) Appl. No.: 16/700,122

(22) Filed: Dec. 2, 2019

(65) Prior Publication Data

US 2020/0183365 A1 Jun. 11, 2020

(30) Foreign Application Priority Data

Dec. 5, 2018 (JP) .............................. JP2018-228185

(51) Int. Cl.
| | | |
|---|---|---|
| *G05B 19/418* | (2006.01) | |
| *G05B 19/409* | (2006.01) | |
| *G06T 7/00* | (2017.01) | |
| *G05B 19/4063* | (2006.01) | |
| *G06V 20/62* | (2022.01) | |

(52) U.S. Cl.
CPC ....... *G05B 19/4183* (2013.01); *G05B 19/409* (2013.01); *G05B 19/4063* (2013.01); *G06T 7/0002* (2013.01); *G06V 20/62* (2022.01); *G06T 2200/24* (2013.01)

(58) Field of Classification Search
CPC .............. G05B 19/4183; G05B 19/409; G05B 19/4063; G05B 2219/37074; G05B 2219/37084; G05B 19/4065; G05B 2219/37616; G06K 9/325; G06K 2209/19;
(Continued)

(56) References Cited

U.S. PATENT DOCUMENTS

2003/0233164 A1* 12/2003 Maeda ................ G05B 19/408
700/180
2007/0123403 A1* 5/2007 Kitamura ........... G05B 19/4065
483/8
(Continued)

FOREIGN PATENT DOCUMENTS

| JP | WO 1992/013303 | * 8/1992 |
|---|---|---|
| JP | H05027819 A | 2/1993 |

(Continued)

OTHER PUBLICATIONS

English Abstract for Japanese Publication No. 2017084108 A, published May 18, 2017, 2 pgs.
(Continued)

*Primary Examiner* — Hien D Khuu
(74) *Attorney, Agent, or Firm* — Fredriksen & Byron, P.A.

(57) ABSTRACT

A recognition device includes: an image generator configured to acquire a control signal for displaying an image on a display device of a machine tool, the control signal being output from a display control device of the machine tool, and generate an image to be displayed on the display device, based on the acquired control signal; and an information generator configured to recognize at least one of state and control content of the machine tool, contained in the image, and generate machine information.

6 Claims, 10 Drawing Sheets

(58) Field of Classification Search
CPC .............. G06K 9/00671; G06T 7/0002; G06T 2200/24
USPC ........................................................ 700/159
See application file for complete search history.

(56) References Cited

U.S. PATENT DOCUMENTS

| | | | |
|---|---|---|---|
| 2008/0086220 A1* | 4/2008 | Ogawa ............... | G05B 19/4069 700/15 |
| 2013/0257738 A1* | 10/2013 | Tanaka ................ | G05B 19/409 345/168 |
| 2013/0338809 A1* | 12/2013 | Kume ................ | G05B 19/4069 700/97 |
| 2014/0012408 A1 | 1/2014 | Naga et al. | |
| 2015/0091898 A1* | 4/2015 | Tanaka .................... | G06T 19/20 345/419 |
| 2016/0320764 A1* | 11/2016 | Ogawa .................. | G05B 19/19 |
| 2017/0123820 A1 | 5/2017 | Nishi et al. | |
| 2017/0146978 A1* | 5/2017 | Kawai ................ | G05B 19/4063 |
| 2017/0300035 A1* | 10/2017 | Kawai ................ | G05B 19/4068 |
| 2017/0308055 A1* | 10/2017 | Hoshino .............. | G05B 19/409 |

FOREIGN PATENT DOCUMENTS

| | | | |
|---|---|---|---|
| JP | 0816959 | * | 1/1998 |
| JP | 1811353 | * | 7/2007 |
| JP | 201413539 A | | 1/2014 |
| JP | WO 2016/051544 | * | 4/2016 |
| JP | 2017069963 A | | 4/2017 |
| JP | 201784108 A | | 5/2017 |
| JP | WO 2017/149667 | * | 9/2017 |

OTHER PUBLICATIONS

English Abstract for Japanese Publication No. 2014013539 A, published Jan. 23, 2014, 2 pgs.
English Abstract and Machine Translation for Japanese Publication No. JPH05-027819A, published Feb. 5, 1993, 6 pgs.
English Abstract and Machine Translation for Japanese Publication No. JP2017-069963A, published Apr. 6, 2017, 10 pgs.

* cited by examiner

RECOGNITION DEVICE, SYSTEM AND RECOGNITION METHOD

CROSS-REFERENCE TO RELATED APPLICATION

This application is based upon and claims the benefit of priority from Japanese Patent Application No. 2018-228185 filed on Dec. 5, 2018, the contents of which are incorporated herein by reference.

BACKGROUND OF THE INVENTION

Field of the Invention

The present invention relates to a recognition device and a recognition method for recognizing display contents displayed on a display device of a machine tool, as well as to a system including the recognition device.

Description of the Related Art

A numerical control device for controlling machine tools causes a machine tool to machine a workpiece by controlling relative motion between a spindle attached with a tool and a table with the workpiece fixed thereon in accordance with a machining program. Japanese Laid-Open Patent Publication No. 2014-013539 discloses a numerical control device that reads a machining program from a memory and executes a machining process according to the read machining program.

SUMMARY OF THE INVENTION

Incidentally, to acquire machine information indicating the status of an existing machine tool controlled by a numerical control device from the machine tool, dedicated hardware and a program as an interface for acquiring the machine information are needed in the machine tool. To cope with the current situation, there is a demand for a configuration that facilitates acquisition of machine information.

It is therefore an object of the present invention to provide a recognition device, system and recognition method that can easily acquire machine information.

A first aspect of the present invention resides in a recognition device for recognizing display contents displayed on a display device of a machine tool, including: an image generator configured to acquire a control signal for displaying an image on the display device, the control signal being output from a display control device of the machine tool, and generate the image to be displayed on the display device, based on the acquired control signal; and an information generator configured to recognize at least one of the state and the control content of the machine tool, contained in the image, and generate machine information.

A second aspect of the present invention resides in a system including the above recognition device and the collection device for collecting the machine information, in which the collection device is configured to collect the machine information generated based on the image displayed on each display device in a plurality of machine tools.

A third aspect of the present invention reside in a recognition method for recognizing display contents displayed on a display device of a machine tool, including: an acquiring step of acquiring a control signal for displaying an image on the display device, the control signal being output from a display control device of the machine tool; an image generation step of generating the image to be displayed on the display device, based on the control signal; and an information generating step of recognizing at least one of the state and the control content of the machine tool, contained in the image, to generate machine information.

According to the present invention, connection of the recognition device to a wiring that connects the display control device and the display device enables machine information to be generated based on the control signal output from the display control device. Therefore, it is possible to acquire machine information without providing any dedicated hardware in the machine tool. Thereby, machine information can be acquired easily.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing preferred embodiments with reference to the accompanying drawings.

EMBODIMENT

First Embodiment

Figure 1:
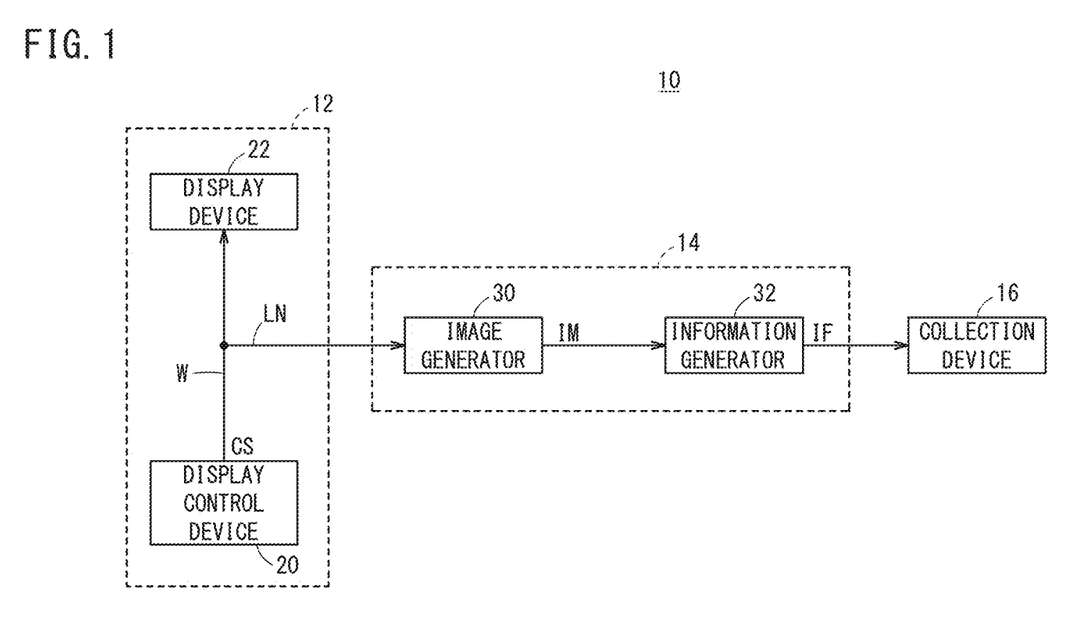
FIG. 1 is a schematic diagram showing a system according to a first embodiment.

FIG. 1 is a schematic diagram showing a system 10 according to a first embodiment. The system 10 includes a machine tool 12, a recognition device 14, and a collection device 16.

The machine tool 12 machines a workpiece using a tool, and includes a display control device 20 and a display device 22. The display control device 20 outputs a control signal CS for displaying an image on the display device 22, and the display device 22 displays an image based on the control signal CS.

The recognition device 14 recognizes display contents displayed on the display device 22. The recognition device 14 may be a numerical control device that controls the machine tool 12, or may be a processing device independent and different from the numerical control device. When the recognition device 14 is a processing device, the processing device may be connected to the numerical control device or a management device via an expansion slot or the like provided in the numerical control device or the management device. The management device is connected to a plurality of numerical control devices via a network and manages the numerical control devices.

The collection device 16 collects machine information IF output from the recognition device 14. The collection device 16 may be the above-mentioned management device. In FIG. 1, the collection device 16 is provided separately from the recognition device 14, but may be provided as a part of the recognition device 14. Alternatively, the recognition device 14 may be provided as a part of the collection device 16.

Next, the recognition device 14 will be specifically described. The recognition device 14 includes an image generator 30 and an information generator 32.

The image generator 30 has a connection line LN that is connected to a wiring W connecting the display control device 20 and the display device 22, and acquires the control signal CS output from the display control device 20 via the connection line LN.

When the image generator 30 acquires the control signal CS, the image generator 30 generates an image IM to be displayed on the display device 22 of the machine tool 12 based on the control signal CS, and outputs the generated image IM to the information generator 32. As the representation format of the image IM, a bitmap format can be exemplified. The image IM generated by the image generator 30 includes the states or control contents of the machine tool 12.

The states of the machine tool 12 include, for example, coordinate values indicating at least one of machine coordinates, workpiece coordinates and relative coordinates, the F value indicating the feed rate, the remaining amount of movement (distance to target), the machining time, the operating time, the spindle rotational speed and spindle motor load, a fixed cycle indicating the condition of a fixed machining cycle, automatic operation mode, alarm state, and others. Examples of the control content of the machine tool 12 include the machining program being executed, modal information, the program number, PMC parameters, ladder, the sequence number, and others.

Figure 2:
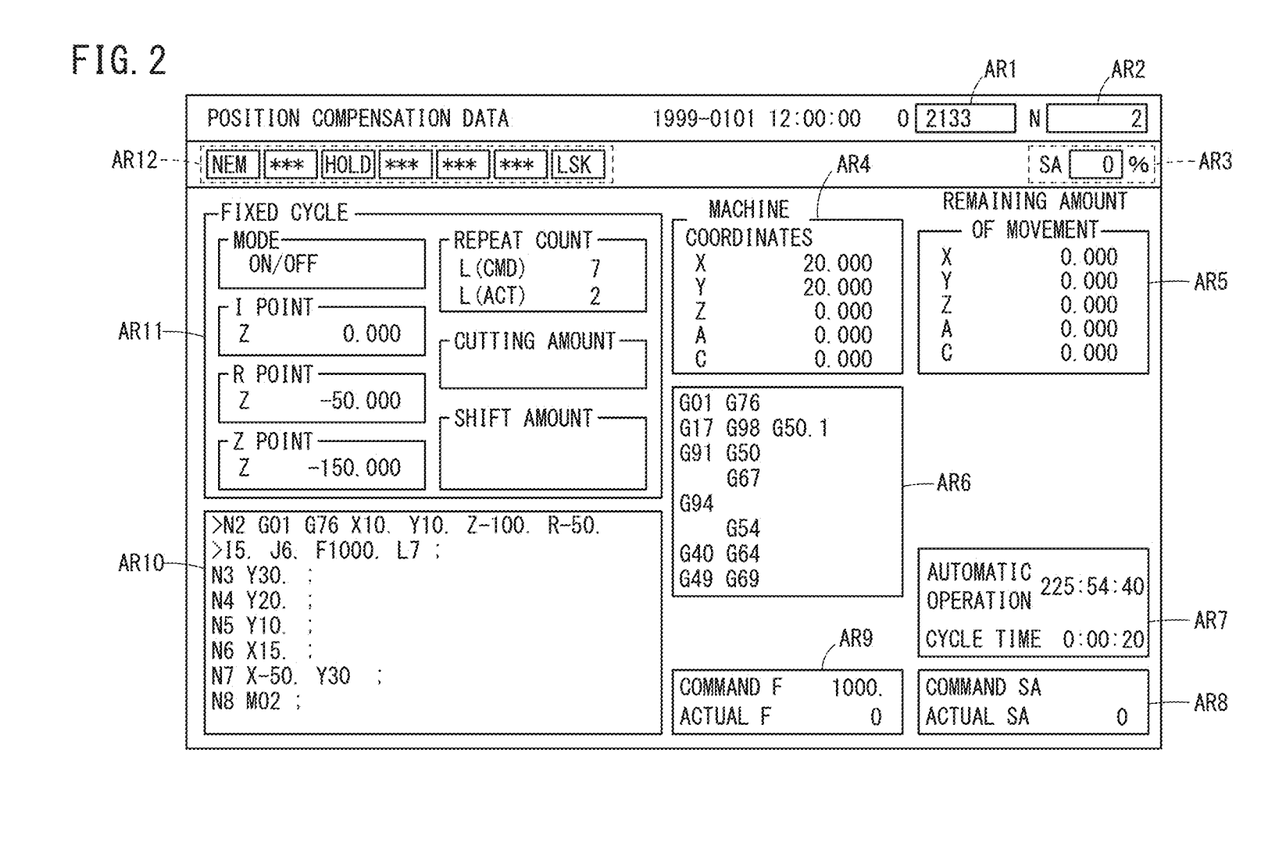
FIG. 2 is a diagram illustrating an image generated based on a control signal.

FIG. 2 is a diagram illustrating an image IM generated based on the control signal CS. The image IM illustrated in FIG. 2 has a plurality of display areas AR1 to AR12, which each contain text or graphics indicating the state or control content of the machine tool 12. Here, the text shall include figures and symbols. The graphics shall include buttons and indicators.

Specifically, the display area AR1 shows the program number, the display area AR2 shows the sequence number, the display area AR3 shows the spindle motor load, the display area AR4 shows the machine coordinates, the display area AR5 shows the remaining amount of movement (distance to target), and the display area AR6 shows modal information. The display area AR7 shows the machining time, the display area AR8 shows the spindle rotational speed, the display area AR9 shows the F value, the display area AR10 shows the program being executed, the area AR11 shows a fixed cycle, and the display area AR12 shows the automatic operation mode and the alarm conditions. In the illustration of FIG. 2, the state or control content of the machine tool 12 is indicated by text in each of the display areas AR1 to AR11, and the state or control content of the machine tool 12 is indicated by text and figures (buttons) in the display area AR12.

When the information generator 32 receives the image IM output from the image generator 30, the information generator 32 recognizes at least one of the state and the control content of the machine tool 12, contained in the image IM and generates machine information IF. More specifically, the information generator 32 preliminarily holds screen configuration information used in the machine tool 12. Thus, the information generator grasps, based on the screen configuration information, what state or control content the text or graphics included in the image IM means, and thereby generates the machine information IF. Here, the screen configuration information may comprise multiple known display images used in the machine tool 12, or may comprise a database that associates, for each of the display images, the display position (coordinates) with the text or graphics to be displayed in the display position.

For example, based on the screen configuration information, the information generator 32 recognizes from the display area AR3 that "the load of the spindle motor is 0%", and generates machine information IF indicating the recognition result. Additionally, for example, the information generator 32, based on the screen configuration information, recognizes from the display area AR10 that "the program being executed is >N2 G01 G76 X10.Y10. Z-100. R-50. >I5. J6 F1000. L7; N3 Y30.; N4 Y20.; N5 Y10.; N6 X15.; N7 X-50. Y30; N8 M02" and generates machine information IF indicating the recognition result.

Thus, the connection line LN is connected to the wiring W connecting the display control device 20 and the display device 22, so that the recognition device 14 can generate the machine information IF based on the control signal CS output from the display control device 20. It is therefore possible to acquire the machine information IF without modifying the program of the machine tool 12 or providing any dedicated hardware in the machine tool 12. Thereby, machine information IF can be acquired easily.

Figure 3:
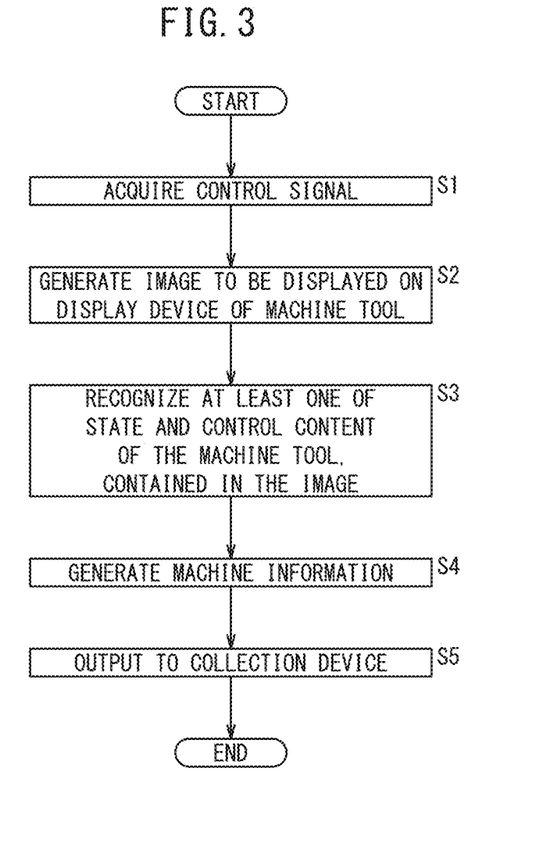
FIG. 3 is a flowchart showing a processing flow of a recognition device in the first embodiment.

Next, the recognition method of the recognition device 14 will be described. FIG. 3 is a flowchart showing a processing flow of the recognition device 14 in the first embodiment.

At step S1, the image generator 30 acquires the control signal CS that is output from the display control device 20 to the display device 22, by way of the connection line LN connected to the wiring W, and then at step S2, generates an image IM based on the control signal CS. Subsequently, the process proceeds to step S3.

At step S3, the information generator 32 recognizes at least one of the state and the control content of the machine tool 12, contained in the image IM. Next, the process goes to step S4, and the information generator generates machine information IF based on the recognition at step S4. Then, the process goes to step S5, at which the information generator 32 outputs the machine information IF to the collection device 16. Thereafter, the process of the recognition device 14 is ended.

Second Embodiment

Figure 4:
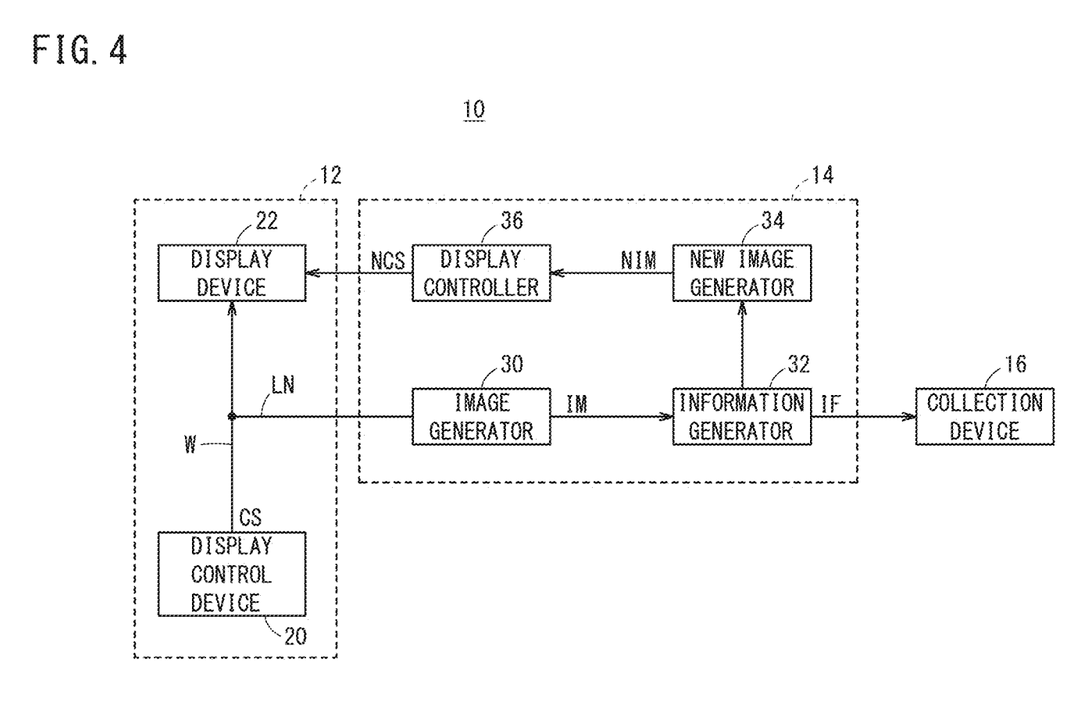
FIG. 4 is a schematic diagram showing a system according to a second embodiment.

FIG. 4 is a schematic diagram showing a system 10 according to the second embodiment. In FIG. 4, the same components as those described in the first embodiment are allotted with the same reference numerals, and description on the system 10 of this embodiment that overlaps that of the first embodiment will be omitted.

The recognition device 14 in the system 10 of the present embodiment further includes a new image generator 34 and a display controller 36 in addition to the image generator 30 and the information generator 32 of the first embodiment.

The new image generator 34 generates a new image NIM in which the display mode for at least one of the state and the control content of the machine tool 12 is changed based on the machine information IF output from the information generator 32. The display mode involves at least one of the display format and the display position.

Figure 5:
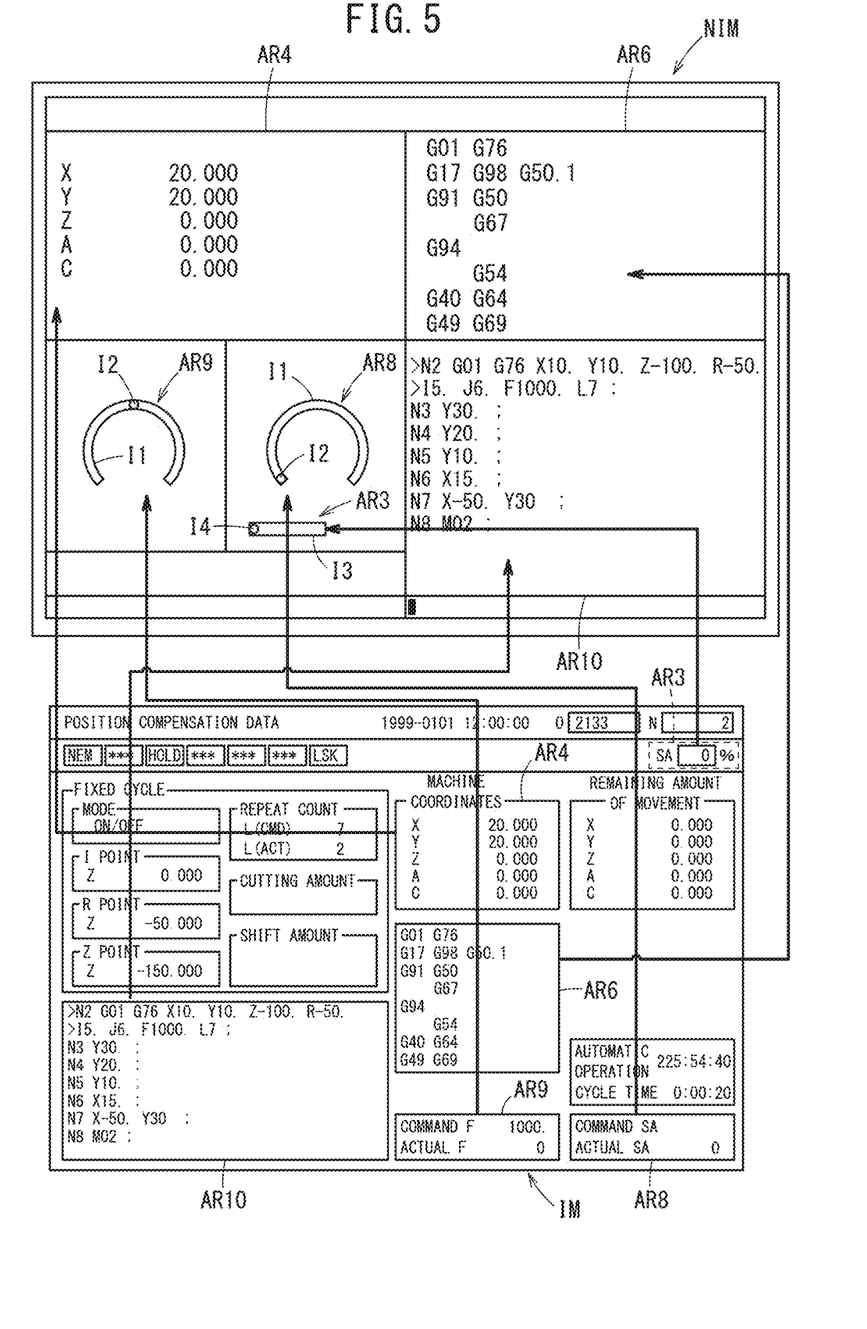
FIG. 5 is a diagram illustrating how a new image is produced.

FIG. 5 is a diagram illustrating how a new image NIM is produced. FIG. 5 shows how a new image NIM is formed based on the machine information IF generated from the image IM illustrated in FIG. 2.

In the illustration of FIG. 5, the display area AR3 is located substantially upper right in the image IM, but in the new image NIM, the location of AR3 is changed to the left in approximately the vertically center. In addition, the display area AR3 is represented in a text format "SA0%" in the image IM, whereas in the new image NIM, it is replaced by an indicator bar 13 with an indicator (indicator point) 14 placed at the position corresponding to 0% on the indicator bar 13. That is, the new image generator 34 changes both the display position and the display format for the display area AR3 showing the load on the spindle motor.

Further, in the example of FIG. 5, the display area AR4 is displayed substantially on the upper right side in the image IM, but it is transferred to approximately the upper left in the new image NIM. That is, the new image generator 34 changes the display position for the display area AR4 showing the machine coordinates.

In the example of FIG. 5, the display area AR6 is displayed on substantially the right side in the vertical center of the image IM, but it is changed to approximately the upper right in the new image NIM. That is, the new image generator 34 changes only the display position for the display area AR6 showing modal information.

In the example of FIG. 5, the display area AR8 is displayed in substantially the lower right in the image IM, but it is transferred to approximately the left in the vertical center in the new image NIM. The display format of the display area AR8 is given by text "COMMAND SA REAL SA 0" in the image IM, whereas in the new image NIM, it is replaced by an indicator arc I1 with an indicator (indicator point) 12 placed in the position corresponding to 0 on the indicator arc I1. That is, the new image generator 34 changes both the display position and the display format for the display area AR8 indicating the spindle rotational speed.

Further, in the example of FIG. 5, the display area AR9 is displayed in substantially the lower right in the image IM, whereas it is transferred to approximately the left in the vertically center in the new image NIM. In addition, the display format of the display area AR9 is given by text "COMMAND F 1000. REAL F 0" in the image IM, whereas in the new image NIM, it is replaced by an indicator arc I1 with an indicator (indicator point) 12 placed in a position corresponding to 1000 in the indicator arc I1. That is, the new image generator 34 changes both the display position and the display format for the display area AR9 showing the F value.

In the example of FIG. 5, the display area AR10 is displayed in substantially the lower left in the image IM, whereas it is transferred to approximately the right in the vertical center in the new image NIM. That is, the new image generator 34 changes only the display position for the display area AR10 showing the program being executed.

Thus, based on the machine information IF output from the information generator 32, the new image generator 34 generates a new image NIM in which the display mode of at least one of the state of the machine tool 12 and the control content is changed. When the new image generator 34 generates a new image NIM, the new image generator 34 outputs the generated new image NIM to the display controller 36.

Upon receiving the new image NIM output from the new image generator 34, the display controller 36 generates a new control signal NCS for displaying the new image NIM, and outputs the generated new control signal NCS to the display device 22. As a result, the display device 22 displays the new image NIM based on the new control signal NCS.

As described above, according to the recognition device 14 of this embodiment, it is possible to display, on the display device 22, a new image NIM in which the display mode is changed based on the current trends and the like, without modifying the program of the machine tool 12 or without providing the machine tool 12 with dedicated hardware.

Figure 6:
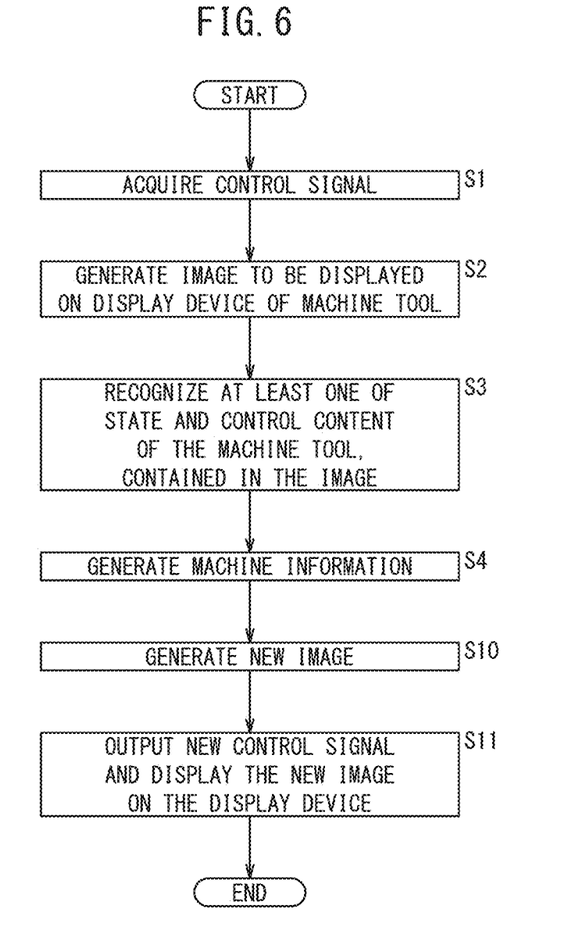
FIG. 6 is a flowchart showing a processing flow of a recognition device in the second embodiment.

Next, the recognition method of the recognition device 14 will be described. FIG. 6 is a flowchart showing the processing flow of the recognition device 14 in the second embodiment. In FIG. 6, the same steps as those described in the first embodiment are denoted by the same reference numerals. In the recognition method of this embodiment, description overlapping that of the first embodiment will be omitted.

In the recognition method of this embodiment, step S5 included in the first embodiment is omitted, and steps S10 and S11 are newly added after step S4. That is, at step S10, the new image generator 34 generates a new image NIM based on the machine information IF generated by the information generator 32 at step S4, and the process proceeds to step S11. At step S11, the display controller 36 generates a new control signal NCS for displaying the new image NIM, and outputs the generated new control signal NCS to the display device 22 so as to display the new image NIM on the display device 22. Thereafter, the control of the recognition device 14 is ended.

In the recognition method of this embodiment, step S5 of the first embodiment is omitted, but may be inserted between step S4 and step S10 or after step S11.

Third Embodiment

Figure 7:
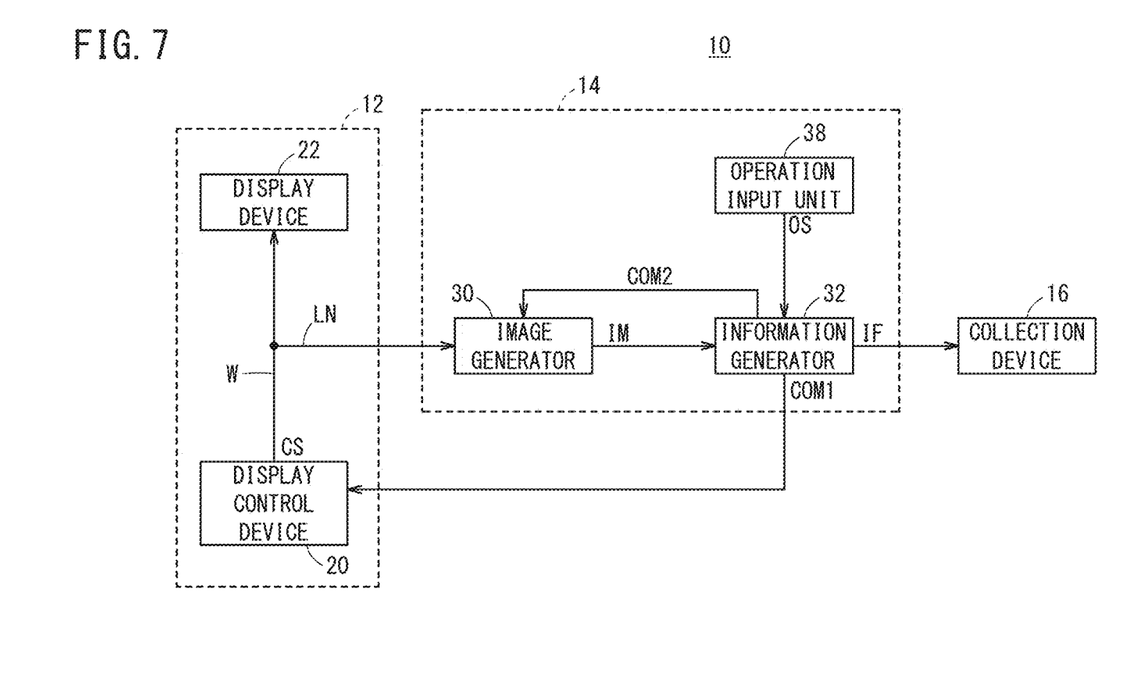
FIG. 7 is a schematic diagram showing a system according to a third embodiment.

FIG. 7 is a schematic diagram showing a system 10 according to a third embodiment. In FIG. 7, the same components as those described in the above embodiment are allotted with the same reference numerals, and in the system 10 of this embodiment, description overlapping that of the above embodiment is omitted.

The recognition device 14 in the system 10 according to the present embodiment newly includes an operation input unit 38 in addition to the image generator 30 and the information generator 32 of the first embodiment.

The operation input unit 38 generates an operation signal OS in response to operator's operation and outputs the generated operation signal OS to the information generator 32. The information generator 32 determines, based on the operation signal OS, whether or not an image switching operation to switch the current display image has been performed. When determining that an image switching operation has been performed, the information generator 32 generates an image switching command COM1. In this case, the information generator 32 outputs the generated image switching command COM1 to the display control device 20 so as to cause the display control device 20 to switch the current display image to the image IM designated by the operator's image switching operation.

Further, the information generator 32 determines whether or not an operation for ending acquisition of the control signal CS has been performed, based on the operation signal OS. When it is determined that an operation for ending acquisition of the control signal CS has been performed, the information generator 32 generates a stop command COM2. In this case, the information generator 32 outputs the generated stop command COM2 to the image generator 30 to thereby control the image generator 30 so as to stop acquisition of the control signal CS output from the display control device 20.

In the above way, according to the recognition device 14 of the present embodiment, it is possible to acquire more machine information IF on the machine tool 12.

Note that the image switching operation may be executed outside the recognition device 14. When the image switching operation is executed outside the recognition device 14, an operation signal OS is supplied to the information generator 32 from the outside of the recognition device 14. In this case, the operation input unit 38 may be omitted.

Alternatively, the information generator 32 may be configured to control the display control device 20 so as to switch to a specific image IM. When switching to a specific image IM, the operation input unit 38 is not necessarily needed. More specifically, the information generator 32 determines, based on the images IM generated by the image generator 30 and screen configuration information held preliminarily, whether or not there is an undisplayed image IM among multiple display images used in the machine tool 12. Here, when there is an undisplayed image IM, the information generator 32 controls the display control device 20 to switch to the image IM. On the other hand, when there is no undisplayed image IM, the information generator 32 controls the display control device 20 to stop acquisition of the control signal CS output from the display control device 20. Also in this way, more machine information IF on the machine tool 12 can be acquired.

Figure 8:
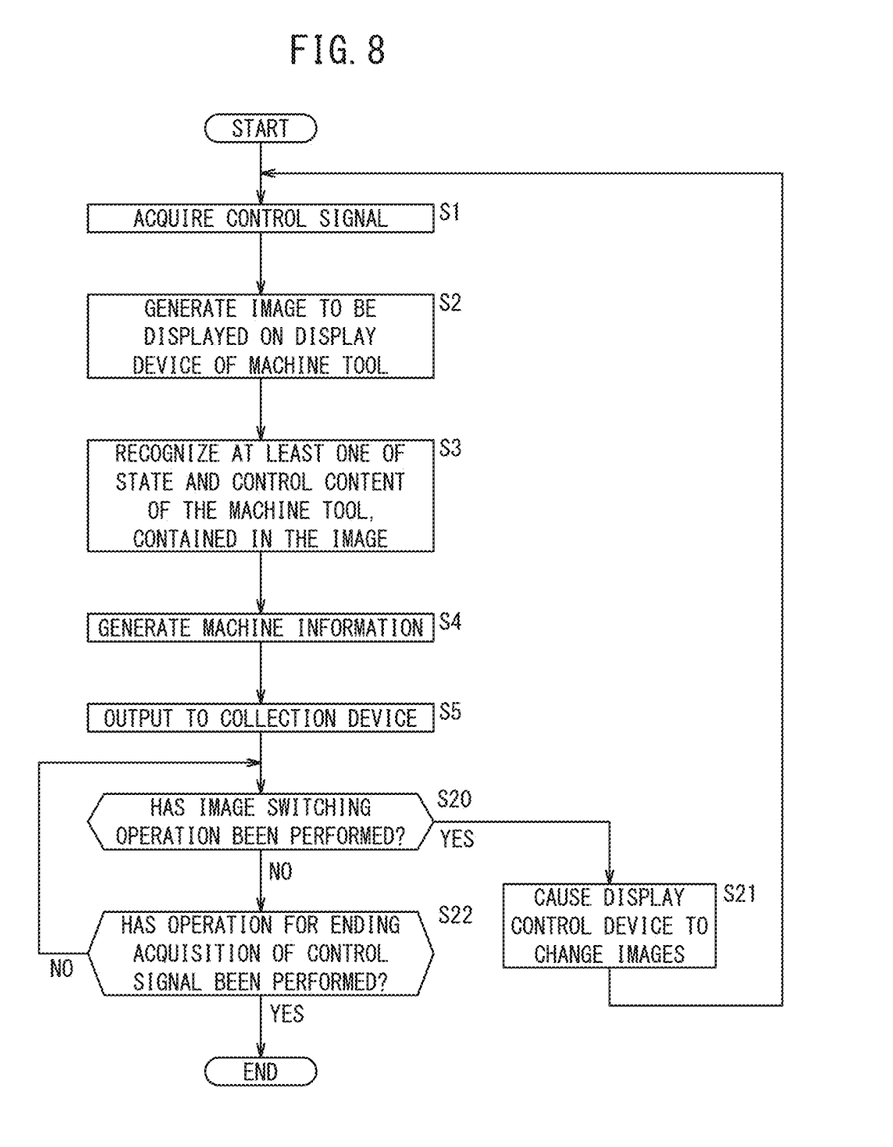
FIG. 8 is a flowchart showing a processing flow of a recognition device in the third embodiment.

Next, the recognition method of the recognition device 14 will be described. FIG. 8 is a flowchart showing a processing flow of the recognition device 14 in the third embodiment. In FIG. 8, the same steps as those described in the first embodiment are denoted by the same reference numerals. In the recognition method of the present embodiment, the description overlapping that of the first embodiment is omitted.

In the recognition method of the present embodiment, steps S20 to S22 are newly added after step S5 of the first embodiment. That is, the information generator 32 outputs the machine information IF to the collection device 16 at step S5, and then proceeds to step S20 to determine whether or not an image switching operation has been performed.

Here, when an image switching operation is performed, the information generator 32 proceeds to step S21. At step S21, the information generator 32 outputs an image switching command COM1 to the display control device 20, to thereby cause the display control device 20 to switch the image IM being displayed on the display device 22 to the image IM designated by the operator's image switching operation. Then, the process returns to step S1.

On the other hand, when no image switching operation is performed, the information generator 32 proceeds to step S22 to determine whether or not an operation for ending acquisition of the control signal CS has been performed. When no acquisition ending operation is performed, the information generator 32 returns to step S20. On the other hand, when an acquisition end operation is performed, the information generator 32 outputs a stop command COM2 to the image generator 30 to stop the image generator 30 from acquiring the control signal CS. In this case, the process of the recognition device 14 is terminated.

It should be noted that the determination of whether or not an image switching operation has been performed may be replaced by the determination of whether or not there is an undisplayed image IM as described above.

[Modifications]

Though the above embodiments have been described as examples of the present invention, the technical scope of the invention should not be limited to the above embodiments. It goes without saying that various modifications and improvements can be added to the above embodiments. It is also apparent from the scope of the claims that modes added with such modifications and improvements should be incorporated in the technical scope of the invention.

(Modification 1)

Figure 9:
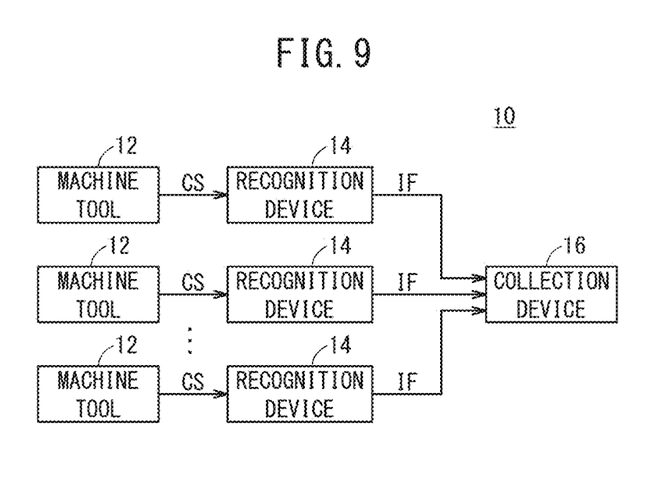
FIG. 9 is a schematic diagram showing a system according to Modification 1.

FIG. 9 is a schematic diagram showing a system 10 in Modification 1. In FIG. 9, the same components as those described in the above embodiment are allotted with the same reference numerals, and as to the system 10 of Modification 1, the description overlapping the above embodiment is omitted.

The system 10 of Modification 1 includes a plurality of machine tools 12, recognition devices 14 provided on the respective machine tools 12, and a collection device 16 connected to the multiple recognition devices 14.

Each of the multiple recognition devices 14 acquires the control signal CS output from the display control device 20 (see FIG. 1 and others) of the corresponding machine tool 12, and outputs to the collection device 16 the machine information IF generated based on the acquired control signal CS, in the same manner as described in the above embodiment.

In this way, according to the system 10 of Modification 1, the machine information IF of each of the multiple machine tools 12 can be collected.

(Modification 2)

Figure 10:
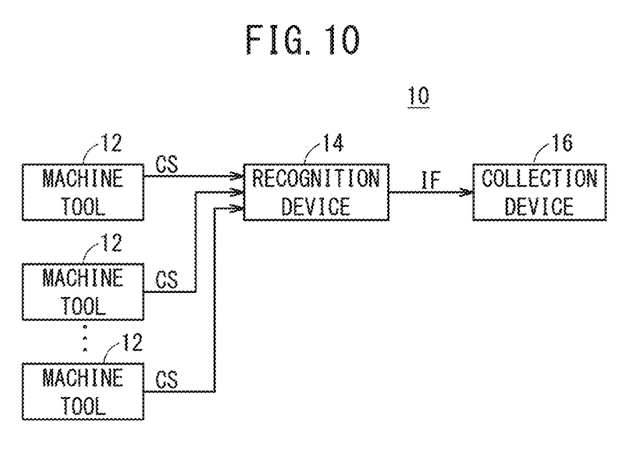
FIG. 10 is a schematic diagram showing a system according to Modification 2.

FIG. 10 is a schematic diagram showing a system 10 according to Modification 2. In FIG. 10, the same components as those described in the above embodiment are allotted with the same reference numerals, and as to the system 10 of Modification 2, the description overlapping the above embodiment is omitted.

The system 10 of Modification 2 includes a plurality of machine tools 12, a single recognition device 14 connected to the machine tools 12, and a collection device 16 connected to the single recognition device 14.

The recognition device 14 acquires the control signal CS output from the display control device 20 (see FIG. 1 and others) in each of the multiple machine tools 12 and outputs to the collection device 16 the machine information IF generated based on the acquired control signal CS, in the same manner as described in the above embodiment.

Thus, according to the system 10 of Modification 2, the machine information IF of each of the multiple machine tools 12 can be collected, similarly to the system 10 of Modification 1.

(Modification 3)

The above embodiments and Modifications 1 and 2 may be arbitrarily combined as long as no contradiction occurs.

Invention Obtained from the Embodiment

The inventions that can be grasped from the above embodiments and Modifications will be described below.
(First Invention)

The first invention is the recognition device (14) for recognizing display contents displayed on a display device (22) of a machine tool (12), including: an image generator (30) configured to acquire a control signal (CS) for displaying an image (IM) on the display device (22), the control signal being output from a display control device (20) of the machine tool (12), and generate the image (IM) to be displayed on the display device (22), based on the acquired control signal (CS); and an information generator (32) configured to recognize at least one of the state and the control content of the machine tool (12), contained in the image (IM), and generate machine information (IF).

This recognition device (14) is able to generate machine information (IF) based on the control signal (CS) output from the display control device (20) by connecting the recognition device to a wiring (W) connecting the display control device (20) and the display device (22). Therefore, it is possible to acquire machine information (IF) without modifying the program of the machine tool (12) or without providing any dedicated hardware in the machine tool (12). Thus, machine information (IF) can be acquired easily.

The information generator (32) may be configured to cause the display control device (20) to switch the image (IM) displayed on the display device (22). This enables acquisition of more machine information (IF) on the machine tool (12).

The recognition device (14) may further include: a new image generator (34) configured to generate a new image (NIM) in which the display mode for at least one of the state and the control content of the machine tool (12) is changed, based on the machine information (IF); and a display controller (36) configured to generate and output a new control signal (NCS) for displaying the new image (NIM). This configuration makes it possible to display a new image (NIM) of which the display mode is changed based on the current trends and the like, without modifying the program of the machine tool (12) or without providing the machine tool (12) with dedicated hardware.

The recognition device (14) may be a numerical control device that controls the machine tool (12), or may be a processing device that is different from a numerical control device that controls the machine tool (12).

The information generator (32) may be configured to output the machine information (IF) to a collection device (16) configured to collect the machine information (IF). This configuration makes possible to utilize the machine information (IF).
(Second Invention)

The second invention is a system (10) including the above-described recognition device (14) and the collection device (16). The collection device (16) is configured to collect the machine information (IF) generated based on the image (IM) displayed on each display device (22) in multiple machine tools (12).

In this system (10), by connecting the recognition device (14) to a wiring (W) that connects the display control device (20) and the display device (22), machine information (IF) can be generated based on the control signal (CS) output from the display control device (20). Therefore, it is possible to acquire machine information (IF) without modifying the program of the machine tool (12) or without providing any dedicated hardware in the machine tool (12). Thereby, machine information (IF) can be acquired easily. Moreover, the machine information (IF) of each of the multiple machine tools (12) can be collected, so that utilization of the machine information (IF) can be enhanced.
(Third Invention)

The third invention is a recognition method for recognizing display contents displayed on a display device (22) of a machine tool (12). This recognition method includes: an acquiring step (S1) of acquiring a control signal (CS) for displaying an image (IM) on the display device (22), the control signal being output from a display control device (20) of the machine tool (12); an image generation step (S2) of generating the image (IM) to be displayed on the display device (22), based on the control signal (CS); and an information generating step (S3, S4) of recognizing at least one of the state and the control content of the machine tool (12), contained in the image (IM), to generate machine information (IF).

In this recognition method, by connecting the recognition device (14) to a wiring (W) that connects the display control device (20) and the display device (22), machine information (IF) can be generated based on the control signal (CS) output from the display control device (20). Therefore, it is possible to acquire machine information (IF) without modifying the program of the machine tool (12) or without providing any dedicated hardware in the machine tool (12). Thereby, machine information (IF) can be acquired easily.

The recognition method may further include a control step (S21) of causing the display control device (20) to switch the image (IM) displayed on the display device (22). This facilitates acquisition of more machine information (IF) on the machine tool (12).

The recognition method may further include: a new image generation step (S10) of generating a new image (NIM) in which the display mode for at least one of the state and the control content of the machine tool (12) is changed, based on the machine information (IF); and a signal output step (S11) of generating and outputting a new control signal (NCS) for displaying the new image (NIM). This method makes it possible to display a new image (NIM) of which the display mode is changed based on the current trends and the like, without modifying the program of the machine tool (12) or without providing the machine tool (12) with dedicated hardware.

The recognition method may further include an information output step (S5) of outputting the machine information (IF) to a collection device (16) configured to collect the machine information (IF). This promotes

What is claimed is:

1. A recognition device for recognizing display contents displayed on a display device of a machine tool, the recognition device comprising:
    a connection line that is connectable to a wiring connecting the display device and a display control device of the machine tool;
    a processor that is independent and separate from a numerical control device that controls the machine tool, the processor programmed to:
        acquire, via the connection line connected to the wiring, a control signal being output from the display control device of the machine tool to the display device;
        generate a display image to be displayed on the display device, based on the acquired control signal; and
        recognize state or control content or both of the state and the control content of the machine tool contained in the display image and generate machine information based on screen configuration information previously stored that indicates the state or the control content or both of the machine tool which a text or graphics included in an image used for the machine tool defines, wherein the machine information is output to a collection device that is independent and separate from the recognition device or a part of the recognition device and configures to collect the machine information generated based on the image displayed on the display device in each of a plurality of machine tools.

2. The recognition device according to claim 1, wherein the display control device is caused to switch the image displayed on the display device.

3. The recognition device according to claim 1, wherein the processor is further programmed to: generate a new image in which a display mode for the state or the control content or both the state and the control content of the machine tool is changed, based on the machine information; and generate and output a new control signal for displaying the new image.

4. A recognition method of a recognition device for recognizing display contents displayed on a display device of a machine tool, the recognition method of the recognition device comprising:

acquiring, via a connection line connected to a wiring connecting the display device and a display control device of the machine tool, a control signal being output from the display control device to the display device;

generating a display image to be displayed on the display device, based on the control signal; and recognizing state or control content or both of the state and the control content of the machine tool contained in the display image, and generating machine information, based on screen configuration information previously stored that indicates the state or the control content or both of the machine tool which a text or graphics included in an image used for the machine tool defines, wherein the recognition device is independent and separate from a numerical control device that controls the machine tool, and wherein the machine information is output to a collection device that is independent and separate from the recognition device or a part of the recognition device and configures to collect the machine information generated based on the image displayed on the display device in each of a plurality of machine tools.

5. The recognition method according to claim 4, further comprising a step of causing the display control device to switch the image displayed on the display device.

6. The recognition method according to claim 4, further comprising steps of: generating a new image in which a display mode for the state or the control content or both of the state and the control content of the machine tool is changed, based on the machine information; and generating and outputting a new control signal for displaying the new image.

* * * * *

UNITED STATES PATENT AND TRADEMARK OFFICE
CERTIFICATE OF CORRECTION

PATENT NO. : 11,422,537 B2
APPLICATION NO. : 16/700122
DATED : August 23, 2022
INVENTOR(S) : Akahide Nagamine and Hideki Otsuki It is certified that error appears in the above-identified patent and that said Letters Patent is hereby corrected as shown below:

In the Specification

Column 10, immediately before "What is claimed is" in the sentence beginning with "This promotes...", should be "This promotes utilization of machine information (IF)."

Signed and Sealed this
Twenty-fifth Day of October, 2022

Katherine Kelly Vidal
*Director of the United States Patent and Trademark Office*